United States Patent [19]

Schneider et al.

[11] Patent Number: 5,585,924
[45] Date of Patent: Dec. 17, 1996

[54] POSITION INDICATOR

[75] Inventors: Erwin Schneider, Liederbach; Frank Göhring, Frankfurt; Harald Frey, Sulzbach, all of Germany

[73] Assignee: VDO Adolf Schindling AG, Frankfurt, Germany

[21] Appl. No.: 401,447

[22] Filed: Mar. 9, 1995

[30] Foreign Application Priority Data

Jun. 15, 1994 [DE] Germany ............... 44 20 551.1

[51] Int. Cl.⁶ ...................................... G01B 11/14
[52] U.S. Cl. .................. 356/373; 356/375; 356/376; 356/385; 356/386; 356/387
[58] Field of Search ..................... 356/373, 375, 356/376, 380, 385–387, 374, 395, 138, 152, 154

[56] References Cited

U.S. PATENT DOCUMENTS 4,979,827  12/1990  Matsui ................... 356/374
5,237,391  8/1993  Huggins ................. 356/373
5,438,416  8/1995  Nater .................... 356/373

*Primary Examiner*—Frank Gonzalez
*Assistant Examiner*—Reginald A. Ratliff
*Attorney, Agent, or Firm*—Martin A. Farber

[57] ABSTRACT

A device for producing an electric signal which corresponds to the position of an object which is movable in translation or rotation relative to a base, wherein by optical scanning of markings which periodically recur upon a movement of the object, analog voltage signals A, Ā and B, B̄ are produced by means of sensors which are spaced apart from each other by one-quarter of the scanning period. The signals are converted in an evaluation circuit with comparators into digital forms of the signals A and B (quadrature signal). In order to produce a test signal S, there is also provided in the device a summation circuit by means of which the voltage signals A, Ā and B, B̄ are added and compared in a comparator with a threshold value.

16 Claims, 4 Drawing Sheets

POSITION INDICATOR

FIELD AND BACKGROUND OF THE INVENTION

The invention relates to a device for producing an electric signal which corresponds to the position of an object which is movable in rotation or translation relative to a base. Analog voltage signals A, $\bar{A}$ and B, $\bar{B}$ are produced by an optical scanning of periodically recurring markings upon movement of the object. The voltage signals are obtained by means of two sensors which are arranged apart from each other by one quarter of the scanning period, the signals being converted into digital signals A and B (quadrature signal) in an evaluation circuit (11) having comparators (12, 13).

In such position indicator devices, the position of a movable object relative to a base is represented by a count value. A reversibly unequivocal association between position and count value exists in the long run, however, only if further conditions are satisfied. Thus, the last count value upon a placing out of operation must be stored in permanent fashion and, furthermore, assurance must be had that the object cannot change its position when the counter is disconnected. As an alternative, it can also be provided that, upon a placing in operation, one always starts from a given position and a corresponding count value. However, this is not always possible, or involves considerable expense since, within the scope of a learning routine, first of all the intended position must be moved too, and automatically ascertained and the counter set to the starting value before the actual placing in operation. Furthermore, counting errors which occur during the operation cannot be compensated for by this.

It has therefore already been proposed to provide, in addition to the periodically recurring markings, an index marking with which, over the entire setting range, a plurality of absolute values of the position can be determined or with which incremental addition and subtraction can be checked and possibly corrected at specific support places (see Federal Republic of Germany 40 41 491 A, and 42 17 168 A1).

With none of the known measures, however, can it be determined whether the periodically recurring markings or the index markings lose their distinguishing force with time. Thus, for instance, in the case of the widely used marking by light-transmitting slots alternating with light-opaque bars, the slots become entirely or partly clogged by deposits produced by wear, so that the light signals become weaker or are even not obtained at all. In this way, one or more counting pulses may be lost so that the association between position and count value is inaccurate. The same error can occur when the source of light used becomes weaker or breaks down temporarily or permanently.

SUMMARY OF THE INVENTION

It is thus an object of the invention to improve or further develop a device of the aforementioned type in such a way that the above-mentioned disadvantages can be overcome. In particular, for certainty-relevant applications there it is desirable to have an automatic function monitoring which, if changes occur such as upon a weakening or failure of the reception of light at the sensors, permits the production of a signal which serves to indicate an error or to effect a safety intervention in a control system.

According to the invention, in order to produce a digital test signal S there is provided, in addition, a summation circuit (14) by means of which the voltage signals A, $\bar{A}$, and B, $\bar{B}$ can be added and compared in a comparator (15) with a threshold value (16).

This is based on the consideration that the sum of all incident light in the case of periodically recurring markings and a measurement window which extends over a full period is the same in each position of the object. Furthermore, upon a comparison of the corresponding electric signal with a predetermined threshold value, decreases in the reception of light can be noted in a comparatively simple manner. In this connection, it is possible to select a threshold value close to 100% of the incident light or else substantially below this, and in this way handle operating conditions with different rates of dirtying.

The inventive concept is applicable directly also to devices having an index marking, provided that the index marking is so arranged that an analog voltage signal I and a signal $\bar{I}$ complementary thereto are obtained in each case, which means nothing else than that their sum gives the same value in every position of the object.

Accordingly, the invention provides an index marking by means of which an analog voltage signal I and a voltage signal $\bar{I}$ complementary thereto can be produced in every position of the object, and that the voltage signals I and $\bar{I}$ can be fed to a summation circuit (14) and the sum can be compared with a threshold value (16) in a comparator (15).

Of course, it is furthermore possible to use both the periodically recurring markings and the index markings in order to produce a digital test signal and, for this purpose, to add all analog voltage signals and compare the sum with a threshold value.

The periodically recurring markings can consist suitably of a series of equally wide light-passage slots (4) and light-opaque bars (5). For the index markings, one can provide, in known manner, a first series of differently wide slots and bars and a second series of differently wide bars and slots, in which connection, in order to obtain complementary signals, an equally wide bar and slot of the second series is opposite each slot and bar of the first series.

The index markings consist advisedly of equi-spaced start-stop characters and coding characters arranged between them, or of groups of n successive characters "0" and n successive characters "1", in which case the successive groups differ by n+1 or n−1 characters depending on the direction of movement of the group n. For a rotating movement of the object, the markings (4, 5) are advantageously arranged on a disk (3).

The test signal S can be used, in accordance with the purpose in view, for determining slots (4) which are clogged by dirt or for "under-lighting" caused in some other manner. However, it can also be used to determine the end and/or the beginning of a slotted or non-slotted partial region if the marking has a non-slotted partial region. In this region, the sum value corresponds to the value which is obtained upon absence of the illumination. The end or start of a slotted partial region can also be used in combination with the production of a test signal in order to adjust the marking upon the assembly with respect to the corresponding position of the movable object.

As a further development of the inventive concept, adjoining the summation circuit (14) there can be used two or more comparators (24, 25) having different threshold values and which, instead of a digital test signal S, produce a digital warning signal W and a digital error signal F. Furthermore, it is possible for the analog voltage signals I and $\bar{I}$ to be converted also into a digital signal I in an evaluation circuit (11) with comparator (23). Finally, it is possible to feed the digital signals A, B, I and S or W and F to a digital/analog converter (17) with which all signals can be converted into a voltage-coded signal which requires only a signal line (20).

As an alternative, the digital signals A, B and I can also be fed to a first digital/analog converter (17) and the signals S or W and F to a second digital/analog converter (26) and the two groups of signals conducted further over two signal lines (20, 27). The second signal line entails a greater expense, but it also results in a substantially greater dependability in operation.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
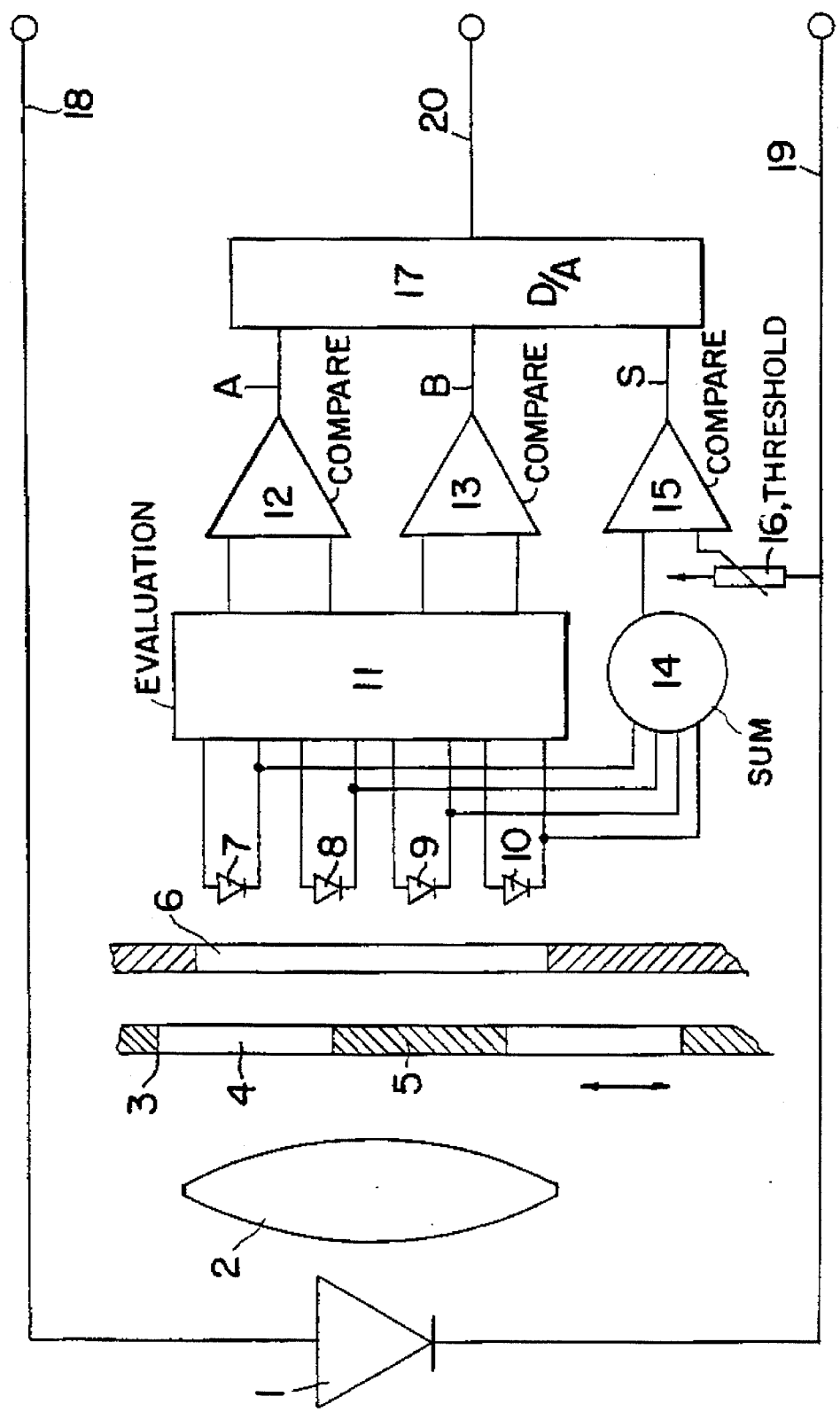
FIG. 1 shows, in simplified form, the function diagram of a device in accordance with a first embodiment of the invention.

The embodiment of the invention contains, in accordance with FIG. 1, a light-emitting diode (LED) 1 which is connected via the lines 18 and 19 with a source of voltage, a lens 2, a movable marking support 3 with equally wide light-pervious slots 4 and light-impervious bars 5, and a diaphragm or window 6 the width of which is equal to the width of a slot plus a bar and thus corresponds to one scanning period. The device furthermore contains four diodes 7 to 10, each of which covers a fourth of the period and produces a voltage proportional to the incident light (see also FIGS. 5 and 6), as well as an evaluation circuit 11, a summation circuit 14, comparators 12, 13, 15, a threshold value generator 16 and a digital/analog convertor 17 with which the digital signals A, B and S are voltage-coded so that only one signal line 20 is necessary for the transmission.

Upon a movement of the marking support 3 in one of the directions of the double-ended arrow, the incidence of light on the individual diodes 7 to 10 changes linearly between a minimum value 0 and a maximum value 1 and back to a minimum value 0, etc., with corresponding changes in the corresponding analog voltage A, $\overline{A}$, B and $\overline{B}$, which are converted into digital signals A and B by the evaluation circuit 11 and the comparators 12 and 13.

In accordance with the invention, all four analog voltages A, $\overline{A}$, B and $\overline{B}$ are furthermore fed to the summation circuit 14 and their sum compared in the comparator 15 with a threshold value 16. Accordingly, a digital test signal S of a value of 0 or 1 is obtained. All digital signals A, B and S can be converted by means of the digital/analog converter 17 into voltage-coded signals and be fed via a single signal line 20 to an evaluation.

Figure 2:
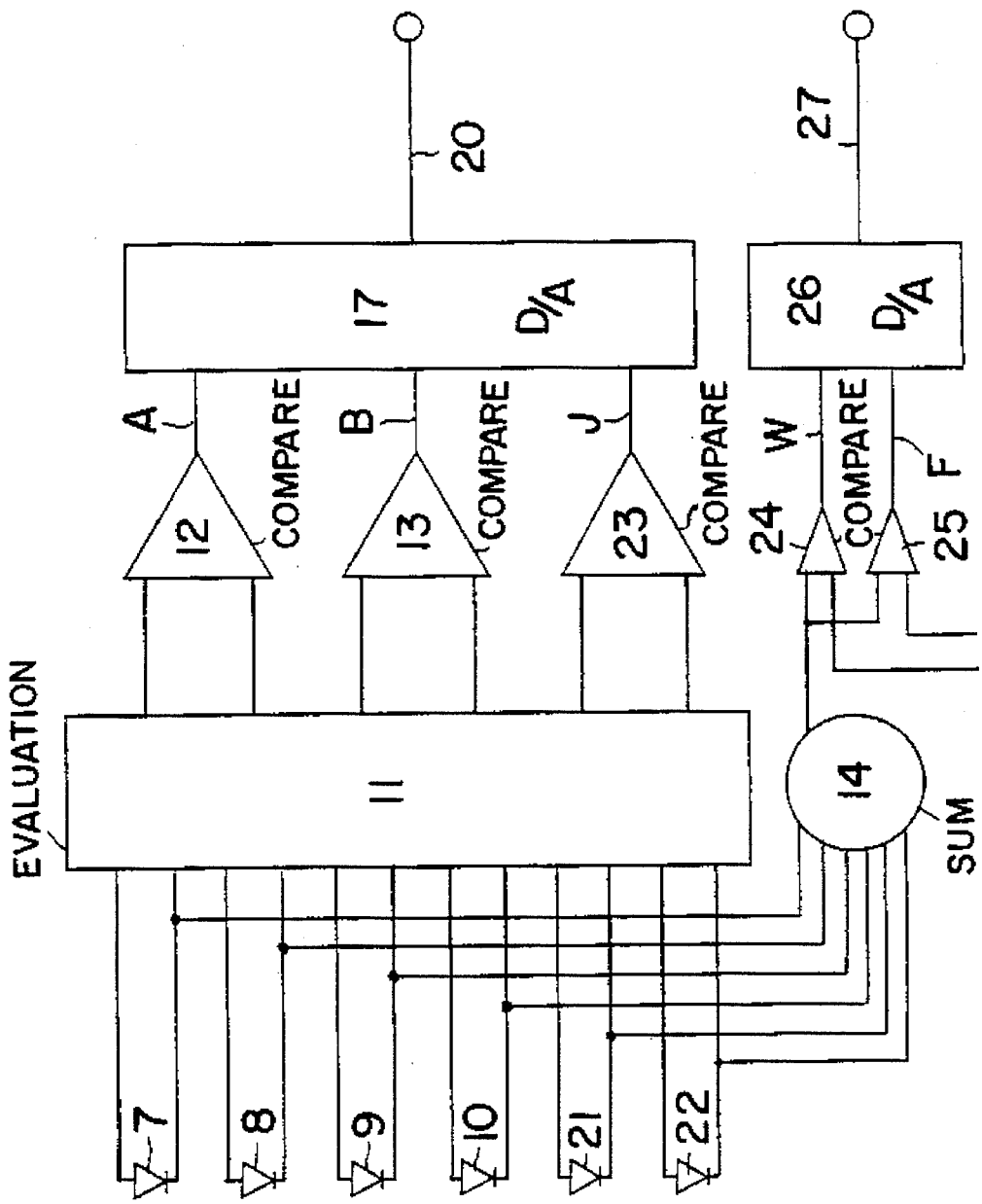
FIG. 2 shows the function diagram of a device in accordance with a second embodiment of the invention.

In FIG. 2, the diodes 7 to 10 are supplemented by two additional diodes 21 and 22 for an analog index voltage I and $\overline{I}$, two separate tracks with corresponding window (not shown) being provided for the index markings in order to obtain complementary signals. The analog voltages I and $\overline{I}$ are fed, like the analog voltages A, $\overline{A}$, B and $\overline{B}$, to the evaluation circuit 11 and converted in the comparator 23 into a digital signal I.

All analog voltages are furthermore fed, in accordance with the invention, to the summation circuit 14 and the resultant voltage sum is compared in the comparators 24 and 25 with two different threshold values. As result, there is obtained a digital warning signal W or a digital error signal F. These latter signals can, as shown, be fed via a separate digital/analog converter 26 over a second signal line 27 to an evaluation, insofar as greater dependability is desired. However, they could also be fed to the digital/analog converter 17 if one wishes to limit oneself to one signal line 20.

Figure 3:
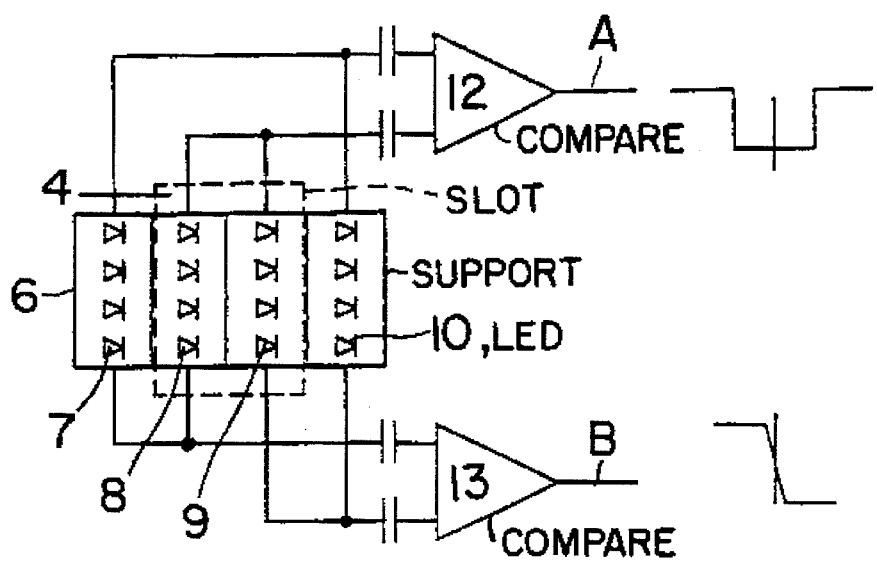
FIG. 3 shows a first position of the sensors relative to a slot marking.

FIG. 3 shows a window 6 with 4 rows of diodes 7 to 10 and a slot 4 of the periodically recurring marking which is so arranged relative to the window that the two central columns of diodes 8 and 9 are fully illuminated while the two outer columns of diodes 7 and 10 lie in the shadow of the bars of the marking. The connecting of the diode outputs is so selected that of 100% light incidence or voltage production 0% appears at the upper input to the comparator 12 and 50% appears at the lower input. At each of the upper and lower inputs of the comparator 13, 25% drops off in the position shown. From this, there result at the comparator outputs the digital signals A and B and the switch conditions indicated alongside of them on the right.

Figure 4:
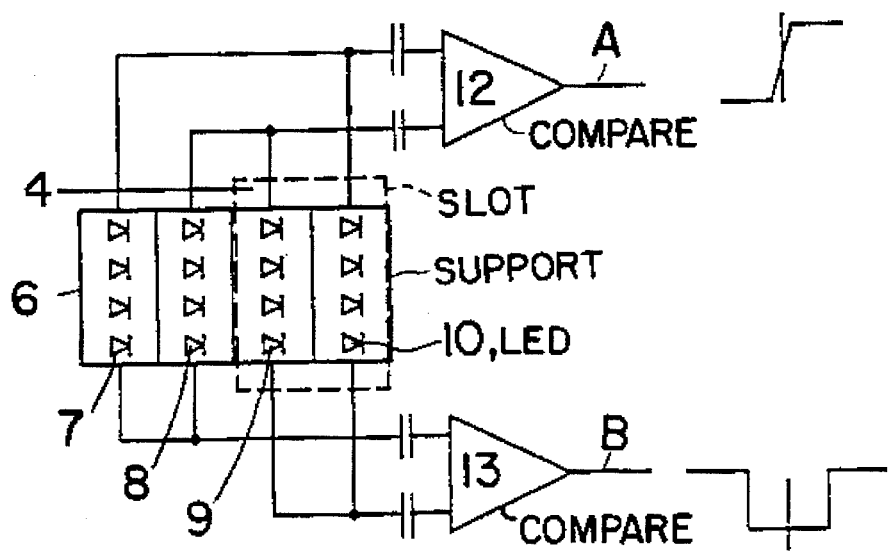
FIG. 4 shows a second position of the sensors, shifted by a quarter period with respect to the slot marking of FIG. 3.

In FIG. 4, the slot 4 is pushed further to the right with respect to the window 6 by one-fourth of the width of the window, i.e. by one column of diodes or a quarter of the period. In this position, 25% each lie at the inputs of the upper comparator 12, and 0% on the top input of the lower comparator and 50% on its bottom input. From this, there result the switch conditions shown on the right thereof.

It may furthermore be mentioned here that, of course, one can also get along with only one diode each 7 to 10. For reasons of redundancy, however, four diodes are provided in each case in the example shown. The reliability of operation can be further increased in the manner that two or more windows having a corresponding number of diodes are arranged alongside of each other and the voltages obtained are fed to a common evaluation, a 100% signal being obtained in all positions over the summation circuit under normal light conditions. Deviations from this are noted in accordance with the invention and produce either a test signal S or a warning signal W and an error signal F.

Figure 5:
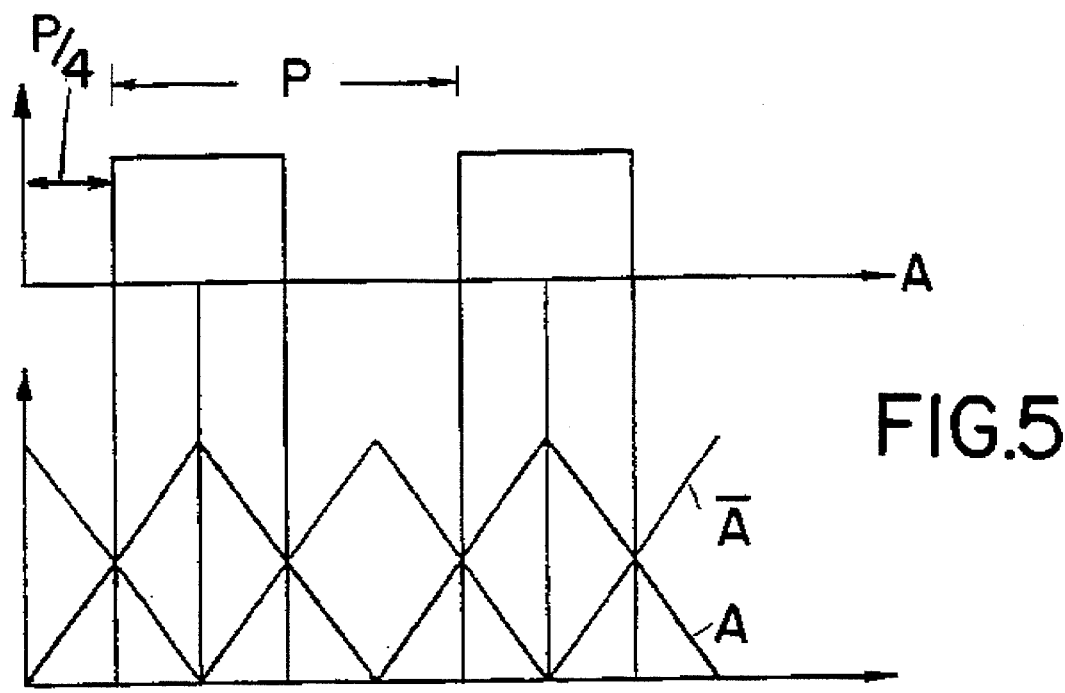
FIG. 5 shows a course of the analog voltages A and $\overline{A}$ with respect to distance and the corresponding digital form of the signal A.
Figure 6:
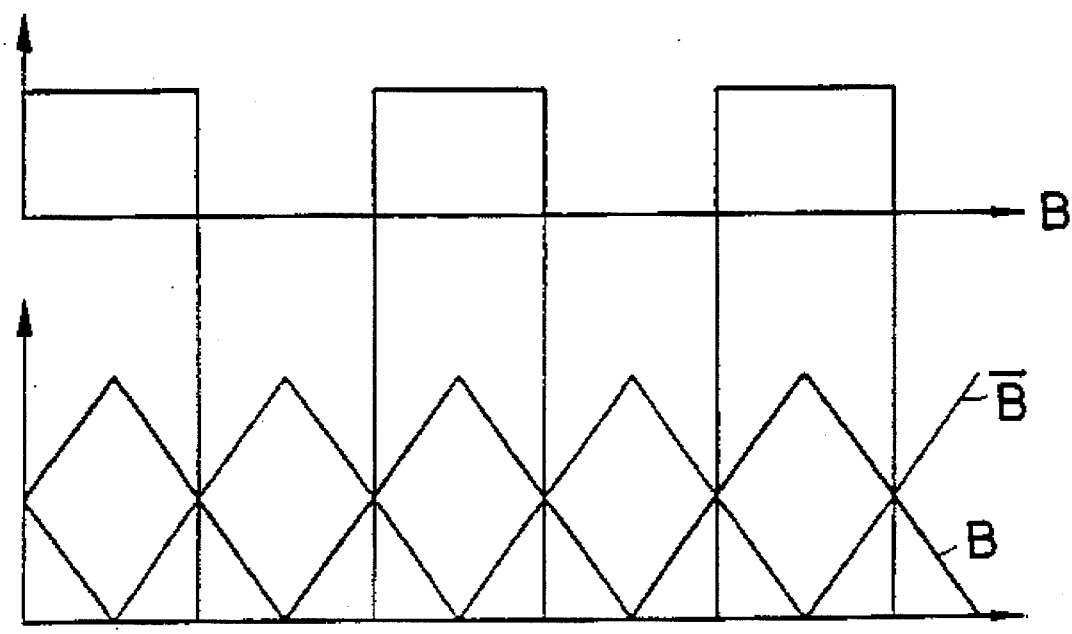
FIG. 6 shows a course of the analog voltages B, $\overline{B}$ with the corresponding form of the digital signal B.

FIGS. 5 and 6 furthermore show how the analog voltage signals A, $\overline{A}$ and B and $\overline{B}$ change upon a movement of the periodically recurring marking relative to the window and, in the upper part in each case, the switch conditions which the digital form the signals A and B assume in this connection. Due to the fact that the periodically recurring signals A are shifted by a quarter period with respect to the signals B, the sign of the counting or information as to the direction of movement can be determined in addition to the count value.

We claim:

1. A device comprising a base and an object movable relative to the base for producing an electric signal which corresponds to the position of the object, the object being movable in rotation or translation relative to the base, the base having a window, the object comprising a series of light pervious and light impervious regions interposed between the light pervious regions, a cross-sectional dimension two successive ones of said regions being equal to a cross-sectional dimension of said window, said regions of said object producing recurring markings during an optical scanning of the object;

wherein the device further comprises plural sensors producing analog voltage signals A, $\overline{A}$ and B and $\overline{B}$ by optical scanning of said recurring markings upon movement of the object, two of said sensors being arranged apart from each other by one quarter of a scanning period;

wherein the device further comprises an evaluation circuit having plural comparators, the signals being converted into digital forms of the signals A and B in said evaluation circuit; and wherein, in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value.

2. A device comprising a base and an object movable relative to the base for producing an electric signal which corresponds to the position of the object, the object being movable in rotation or translation relative to the base;

wherein the device further comprises plural sensors producing analog voltage Signals A, $\overline{A}$ and B and $\overline{B}$ by optical scanning of periodically recurring markings upon movement of the object, two of said sensors being arranged apart from each other by one quarter of a scanning period;

the device further comprises an evaluation circuit having plural comparators, the signals being converted into digital forms of the signals A and B (quadrature signal) in said evaluation circuit; and in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value; and the device further comprises an index marking by means of which an analog voltage signal I and a voltage signal $\overline{I}$ complementary thereto is produced in every position of said object relative to said base; and wherein the voltage signals I and $\overline{I}$ are fed to said summation circuit, the sum being compared with the threshold value in said further comparator.

3. A device according to claim 2, further comprising a periodically recurring marking, and the voltage signals of both markings are added and compared with a threshold value to produce a digital test signal S.

4. A device according to claim 1, further comprising a periodically recurring marking and an index marking, and the voltage signals of both markings are added and compared with a threshold value to produce a digital test signal S.

5. A device according to claim 4, wherein the periodically recurring markings consist of a series of equally wide light-passage slots and light-opaque bars.

6. A device comprising a base and an object movable relative to the base for producing an electric signal which corresponds to the position of the object, the object being movable in rotation or translation relative to the base;

wherein the device further comprises plural sensors producing analog voltage signals A, $\overline{A}$ and B and $\overline{B}$ by optical scanning of periodically recurring markings upon movement of the object, two of said sensors being arranged apart from each other by one quarter of a scanning period;

the device further comprises an evaluation circuit having plural comparators, the signals being converted into digital forms of the signals A and B (quadrature signal) in said evaluation circuit;

in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value;

the device further comprises a periodically recurring marking and an index marking, and the voltage signals of both markings are added and compared with a threshold value to produce a digital test signal S; and the index markings comprise a first series of differently wide slots and bars and a second series of differently wide bars and slots, wherein, an equally wide bar and slot of the second series is opposite each slot and bar of the first series.

7. A device according to claim 6, wherein the index markings comprise equi-spaced start-stop characters and coding characters arranged between them.

8. A device according to claim 6, wherein the index markings comprise groups of n successive characters "0" and n successive characters "1", in which case the successive groups differ by n−1 or n+1 characters depending on the direction of movement of the group n.

9. A device according to claim 4, wherein said object is a disk, and the markings (4, 5) are arranged on said disk.

10. A device comprising a base and an object movable relative to the base for producing an electric signal which corresponds to the position of the object, the object being movable in rotation or translation relative to the base;

wherein the device further comprises plural sensors producing analog voltage signals A, $\overline{A}$ and B and $\overline{B}$ by optical scanning of periodically recurring markings upon movement of the object two of said sensors being arranged apart from each other by one/quarter of a scanning period;

the device further comprises an evaluation circuit having plural comparators, the signals being converted into digital forms of the signals A and B (quadrature signal) in said evaluation circuit;

wherein in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value;

the device further comprises a periodically recurring marking and an index marking, and the voltage signals of both markings are added and compared with a threshold value to produce a digital test signal S; and wherein the test signal S serves to determine a presence of slots which are clogged by dirt or a presence of reduced illumination.

11. A device comprising a base and an object movable relative to the base for producing an electric signal which corresponds to the position of the object, the object being movable in rotation or translation relative to the base;

wherein the device further comprises plural sensors producing analog voltage signals A, $\overline{A}$ and B and $\overline{B}$ by optical scanning of periodically recurring markings upon movement of the object, two of said sensors being arranged apart from each other by one quarter of a scanning period;

the device further comprises an evaluation circuit having plural comparators, the signals being converted into digital forms of the signals A and B (quadrature signal) in said evaluation circuit;

in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value;

the device further comprises a periodically recurring marking and an index marking, and the voltage signals of both markings are added and compared with a threshold value to produce a digital test signal S; and wherein a marking has a non-slotted partial region, and the test signal is used to determine the end and/or the beginning of a slotted or non-slotted partial region.

12. A device comprising a base and an object movable relative to the base for producing an electric signal which corresponds to the position of the object, the object being movable in rotation or translation relative to the base;

wherein the device further comprises plural sensors producing analog voltage signals A, $\overline{A}$ and B and $\overline{B}$ by optical scanning of periodically recurring markings upon movement of the object, two of said sensors being arranged apart from each other by one quarter of a scanning period;

the device further comprises an evaluation circuit having plural comparators, the signals being converted into digital forms of the signals A and B (quadrature signal) in said evaluation circuit;

in order to produce a digital test signal S, the device further comprises a further comparator, and a summation circuit by means of which the voltage signals A, $\overline{A}$, and B, $\overline{B}$ are added, a sum of the voltage signals being compared in said further comparator with a threshold value; and the device further comprises two additional comparators connected to said summation circuit, the two additional comparators having different threshold values to produce a digital warning signal W and a digital error signal F.

13. A device according to claim 2, further comprising an additional comparator, wherein the voltage signal I and $\overline{I}$ are converted into a digital form of the signal I in said evaluation circuit with said additional comparator.

14. A device according to claim 13, further comprising a digital/analog converter, wherein digital forms of the signals are fed to said digital/analog converter to be converted into a voltage-coded signal which is outputted on a single signal line.

15. A device according to claim 4, further comprising a digital/analog converter, wherein digital forms of the signals are fed to said digital/analog converter to be converted into a voltage-coded signal which is outputted on a single signal line.

16. A device according to claim 12, further comprising means for summing signals of said sensors, and a first and a second digital to analog convertor to an output terminal of said summing means;

wherein digital signals forms of the A, B and I are fed to said first digital/analog converter to be outputted by a first output line, and the signals W and F are fed to said second digital/analog converter to be outputted by a second output line.

* * * * *